April 14, 1925.
J. E. PEAVEY
1,533,335
DRY CELL BATTERY UNIT
Filed Nov. 10, 1923
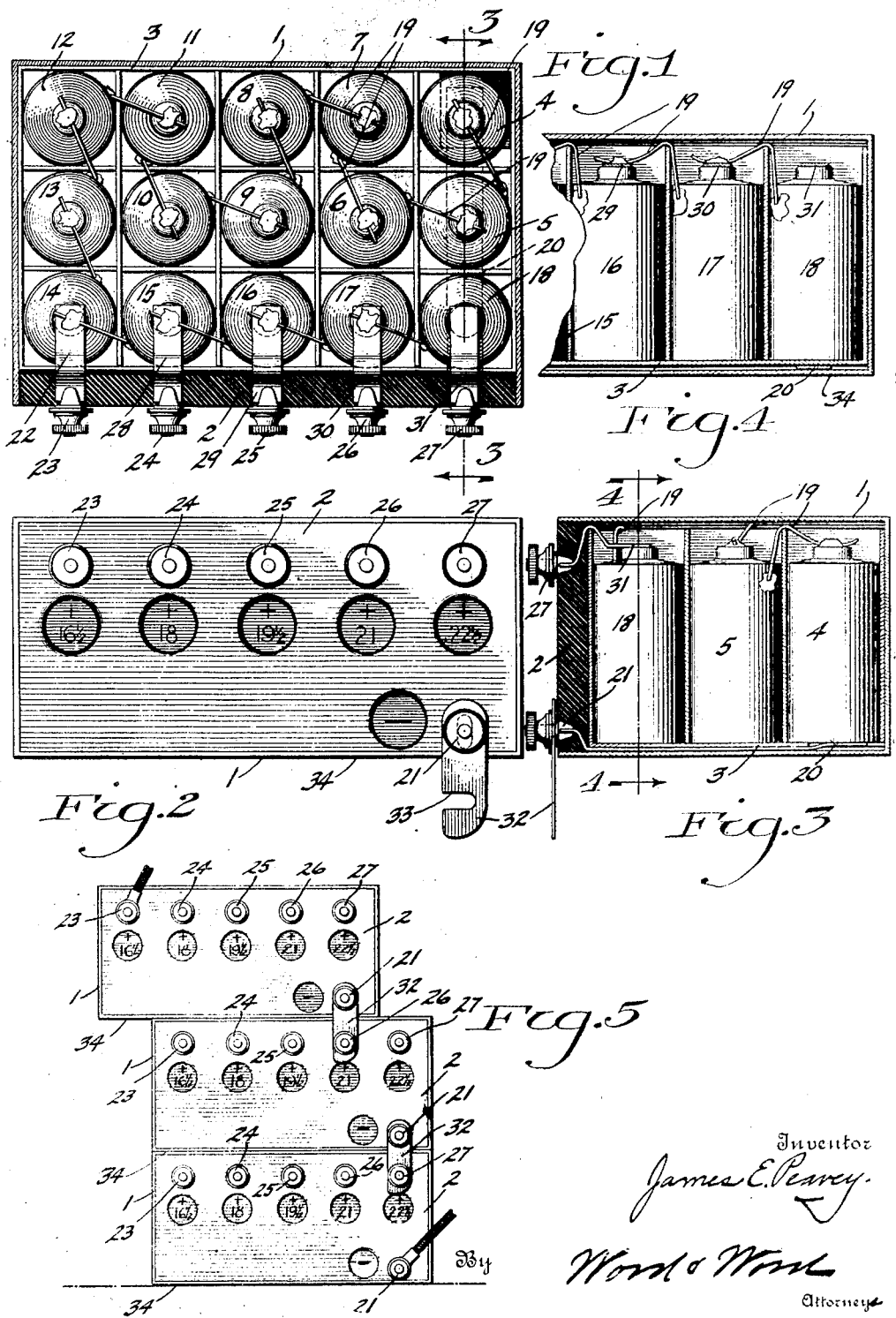

Patented Apr. 14, 1925.

1,533,335

UNITED STATES PATENT OFFICE.

JAMES E. PEAVEY, OF CINCINNATI, OHIO.

DRY-CELL-BATTERY UNIT.

Application filed November 10, 1923. Serial No. 673,925.

To all whom it may concern:

Be it known that I, JAMES E. PEAVEY, a citizen of the United States, and residing at Cincinnati, in the county of Hamilton and State of Ohio, have invented a new and useful Improvement in Dry-Cell-Battery Units, of which the following specification is a full disclosure.

The invention relates to a battery unit composed of a plurality of dry cell batteries compactly grouped and sealed within a container having terminals extending from one side for making various voltage service connections. The unit structure provides for several units to be stacked one upon another and electrically connected for increasing the voltage range. This standardizes the unit into a single size of minimum voltage range with an increase in voltage range obtained by adding unit in a connected capacity.

An object of the invention is to construct a battery unit adapting two or more units to be conveniently connected together by the user without the possibility of short-circuiting them.

Another object is to provide a battery unit in which the dry cells stand vertically, or in an upright position, with an air space at one end of the dry cells between the cells and container, which lengthens life and prevents bulging.

Another object of my invention is to provide a unit battery in which the amount of sealing compound is reduced to a minimum.

Other objects and certain advantages will be more fully set forth in the description of the accompanying drawings forming a part of this specification, in which drawings:

Figure 1 is a section plan view with the top surface of the container removed.

Figure 2 is a front elevation of the battery unit.

Figure 3 is a vertical sectional view on line 3—3 of Fig. 1.

Figure 4 is a sectional view on line 4—4, of Fig. 3.

Figure 5 is a front elevation showing the manner in which the battery units are assembled and connected.

Each battery unit comprises a container 1, as a rectangular box made of cardboard or any other suitable material, open at one side to receive a drawer-like sub-container of cellular structure in which the dry cell batteries are packed, and such open end after the dry cells have been inserted, is sealed with a sealing compound 2, forming an end closure for the container. The sub-container 3 is preferably of cardboard or other insulated material, in the form of a cellular drawer-like structure to provide compartments or pockets open at the top, into which are fitted the individual dry cells, in this instance of a capacity to hold 15 dry cells, 4, 5, 6, 7, 8, 9, 10, 11, 12, 13, 14, 15, 16, 17 and 18. These dry cells are of common commercial type. Each dry cell of the unit is inserted in a respective cell of the sub-container in a vertical or upright position when the unit is set on its proper and normal base 34. The height of the sub-container is slightly greater than the length of the cells to provide an air space between the top of the sub-container and the top of the cell, as a chamber for any gases escaping from the batteries to prevent bulging of the batteries or container.

The unit capacity as shown, is primarily for obtaining a maximum voltage of say 22½ volts with a decreasing voltage range in steps of 1½ each to 16½ volts, obtained by making service connections to a lesser number of the batteries, connected in series. In this connection the dry cells are grouped in three parallel rows of five batteries to each row, all permanently connected in series circuit connection with a negative service conductor and terminal leading from the base of an end dry cell of the series, and a plurality of positive conductors and terminals leading from respective dry cells at the upper side of the dry cells or container to which connections are respectively made for cutting out of circuit a selected number of dry cells for obtaining a decrease in voltage.

In the preferred arrangement the dry cells are in a series circuit connection in the following order: a wire 19 is permanently secured to the positive pole of dry cell 4 and extends over the wall of the sub-container 3 and is securely attached to the negative pole of dry cell 5. The base of the sub-container 3 at a portion beneath the first cell or dry cell 4 is slotted to permit a conductor 20 to pass from the inside of the sub-container 3 for connection with the negative pole of dry cell 4 and extending from said cell forward between the base of sub-container 3 and container 1 and through the sealing end closure wall 2, at the lower side of the closure wall 2, a negative service terminal 21 at the exterior side of said wall 2 being secured upon the conductor 20.

The dry cell 5 has a conductor 19 secured to the positive electrode of said dry cell extending over the partition wall of the sub-container, and secured to negative electrode of dry cell 6. Dry cell 6 in the intermediate row of cells connects with dry cell 7 of the outer row and so on from one row to the second, to the dry cells of the row adjacent the closure wall which are connected in a row.

From dry cell 14 a conductor 22 securely attached to the positive pole thereof passes through the sealing end closure wall and is securely attached to a positive service terminal 23. In like manner, positive service terminals 24, 25, 26 and 27 are connected by conductors 28, 29, 30 and 31 to the positive poles of dry cells 15, 16, 17 and 18 respectively. On the negative service terminal 21 is a metallic clip 32 hinged and provided with a slot 33 capable of engaging any one of the positive terminals of a similar unit battery.

The conductors connecting the dry cells in circuit are looped over respective partition walls, said conductors serving to hold the dry cells in place within the sub-container, and in addition, the dry cells are adhesively secured in their respective cells by paraffine coating the inside surfaces of the sub-container.

The positive service terminals are located in an aligned row at the upper side of the end closure wall 2 and the negative at the lower right hand end of said wall. This arrangement locates the terminals so that no error can be made in making circuit connections, in stacking the battery units for increased voltage service, as shown in Fig. 5.

Having described my invention, I claim:

1. In a battery unit, a container, a plurality of dry cells, a series of service terminals all of the same polarity located adjacent to one edge of sealing compound closure surface, one single service terminal of opposite polarity to and adjacent to edge opposite said first series of service terminals, and a connection fastened to the last described single service terminal shorter in length than the distance to the nearest terminal of the unit, sufficient in length to engage one of the series of service terminals of a like unit when the two sealing compound closing surfaces of the units are in the same geometric plane and two surfaces at right angles thereto in contact.

2. In a unit battery, a container, a sealing wall closure, a sub-container of cellular formation inside of said container for compactly grouping and separating a plurality of dry cells, said sub-container slotted at the bottom of one compartment, a service terminal in end wall closure, a conductor extending from the bottom of said compartment through slot between container and sub-container to said service terminal, and a plurality of dry cells.

3. In a battery unit, a container, a sub-container of cellular formation within said container for compactly grouping in a determined order and relatively separating a plurality of dry cell batteries, a plurality of dry cell batteries respectively disposed in the cells of said sub-container in series electric circuit connection, and in an upright position with respect to the base of said container, the cells of the sub-container being of greater dimension than the longitudinal dimension of the batteries to provide an air space at one end of the batteries, a service terminal conductor in circuit connection with a battery exposed from one side of said container for one circuit lead of the battery unit and a plurality of service terminals connecting in circuit connection with respective batteries of the series, in relative arrangement and order and exposed from a side of said container corresponding with said first named terminal conductor, and providing a plurality of opposite pole circuit leads of the battery.

4. In a battery unit, a container having sealing end wall closure, a sub-container of cellular formation within said container for compactly grouping and relatively separating a plurality of dry cell batteries, a plurality of dry cell batteries respectively disposed in the cells of said sub-container, in an upright position with respect to the base of said container, in electric circuit connection and having terminal leads extending through said end wall closure for making varying voltage service connection, the cells of the sub-container being of greater dimension than the longitudinal diameter of the battery to provide an air space at one end of the batteries.

5. A battery unit comprising a main container and a drawer-like sub-container placed and secured within the main container, the sub-container comprising a series of cell receiving vertical pockets spaced in relation to the cells providing an air chamber at their terminal ends, means unitarily securing the cells to the opposite end of the sub-container, means in the sub-container connecting the pocketed cells in series, and connecting means on the main container to provide service terminals for the unit.

In witness whereof, I hereunto subscribe my name, as attested by the two subscribing witnesses.

JAMES E. PEAVEY.

Witnesses:
R. KISTNER,
C. REED.